United States Patent
Warren et al.

(10) Patent No.: US 10,907,515 B2
(45) Date of Patent: Feb. 2, 2021

(54) METHODS AND DEVICES FOR CONTROLLING THE COMPRESSION RATIO OF AN OPPOSED PISTON ENGINE

(71) Applicant: Warren Engine Company, Alexandria, VA (US)

(72) Inventors: James Warren, Alexandria, VA (US); William Vincent Meyers, Jr., Sherwood Forest, MD (US); Steven Niswander, Bluemont, VA (US)

(*) Notice: Subject to any disclaimer, the term of this patent is extended or adjusted under 35 U.S.C. 154(b) by 0 days.

(21) Appl. No.: 16/525,424

(22) Filed: Jul. 29, 2019

(65) Prior Publication Data

US 2020/0032680 A1 Jan. 30, 2020

Related U.S. Application Data

(60) Provisional application No. 62/711,912, filed on Jul. 30, 2018.

(51) Int. Cl.
| | | |
|---|---|---|
| F01L 7/02 | (2006.01) | |
| F02B 23/06 | (2006.01) | |
| F01L 7/18 | (2006.01) | |
| F01L 13/00 | (2006.01) | |
| F02B 75/26 | (2006.01) | |

(52) U.S. Cl.
CPC ............... *F01L 7/027* (2013.01); *F01L 7/18* (2013.01); *F01L 13/0015* (2013.01); *F02B 23/0648* (2013.01); *F02B 75/26* (2013.01); *F01L 2013/101* (2013.01)

(58) Field of Classification Search
CPC ....... F01L 7/027; F01L 7/018; F01L 13/0015; F01L 2013/101; F01L 7/025; F01L 7/04; F02B 23/0648; F02B 75/26
See application file for complete search history.

(56) References Cited

U.S. PATENT DOCUMENTS

| | | | | |
|---|---|---|---|---|
| 3,288,123 | A * | 11/1966 | Stinebaugh | F02B 33/08 123/58.2 |
| 4,019,487 | A * | 4/1977 | Guenther | F01L 7/16 123/190.17 |
| 5,706,775 | A * | 1/1998 | Schweter | F01L 7/021 123/190.12 |
| 2009/0266339 | A1 * | 10/2009 | Cleeves | F01L 7/00 123/48 R |
| 2013/0319368 | A1 * | 12/2013 | Clarke | F01B 7/14 123/294 |

* cited by examiner

*Primary Examiner* — Syed O Hasan
(74) *Attorney, Agent, or Firm* — Capitol Patent & Trademark Law Firm, PLLC

(57) ABSTRACT

A valve with an opening is driven by an electric motor to rotate around the cylinder of an opposed piston engine such that the opening separately matches an intake and exhaust opening on the cylinder to allow fuel to enter the combustion chamber of the engine and allow exhaust to be expelled. The intake and exhaust cylinder openings may be separated from each other by approximately sixty degrees of the outside of the cylinder.

7 Claims, 6 Drawing Sheets

METHODS AND DEVICES FOR CONTROLLING THE COMPRESSION RATIO OF AN OPPOSED PISTON ENGINE

RELATED APPLICATIONS

The present application claims the benefit of priority of U.S. Provisional Application No. 62/711,912 Application filed Jul. 30, 2018 (the "912'Application"). The present application is related to U.S. Non-Provisional application Ser. No. 16/514,913 filed Jul. 17, 2019 (the "'913 Application"). Further, the present invention is related to U.S. Pat. Nos. 4,993,372, ("'372 Patent"), 5,397,922 ("'922 Patent"), and 9,512,790 ("'790 Patent"), and International Application WO 2014/135,198 ("'198 Application"). The present application incorporates by reference the entire disclosures, including figures, of the '912 Application, '913 and '198 Applications and the '372, '922 and '790 Patents as if they were set forth in full herein.

INTRODUCTION

Opposed-piston engines are well known. However, an ongoing challenge is to decrease the weight and size of the engine thereby enhancing the packaging requirements of the engine. Furthermore, reducing the complexity of the engine while improving the performance characteristics are presented as converging goals.

SUMMARY

A valve with an opening is driven by an electric motor to rotate around the cylinder of an opposed piston engine such that the opening separately matches an intake and exhaust opening on the cylinder to allow fuel to enter the combustion chamber of the engine and allow exhaust to be expelled. The intake and exhaust cylinder openings may be separated from each other by approximately sixty degrees of the outside of the cylinder.

Additional features of the inventions will be apparent from the following detailed description and appended drawings.

DETAILED DESCRIPTION, INCLUDING EXAMPLES

Figure 1A:
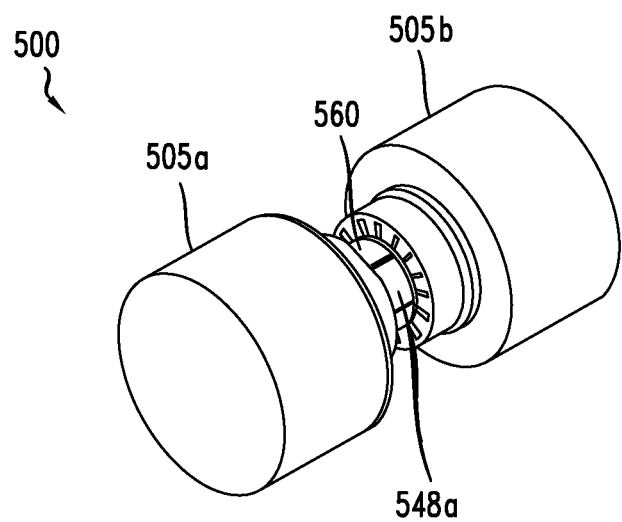
FIGS. 1A and 1B depict an opposed piston engine with a rotary valve mechanism according to an embodiment of the invention.

Exemplary embodiments for controlling the compression ratio of an opposed piston engine are described herein and are shown by way of example in the drawings. Throughout the following description and drawings, like reference numbers/characters refer to like elements.

It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention. Further, though specific structural and functional details may be disclosed herein, these are merely representative for purposes of describing the exemplary embodiments.

It should be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed and may also include additional steps not included in a description of the process/method.

It should be understood that when a system or device or a component or element of a system or device is referred to, or shown in a figure, as being "connected" to (or other tenses of connected) another system, device (or component or element of a system or device) such systems, devices, components or elements may be directly connected, or may use intervening components or elements to aid a connection. In the latter case, if the intervening systems, devices, components or elements are well known to those in the art they may not be described herein or shown in the accompanying figures.

As used herein the term "operable to" means "functions to" unless the context, common sense or knowledge of one skilled in the art indicates otherwise.

As used herein the phrase "controller" means one or more electronic processors or electronic circuitry that is operable to either retrieve and execute instructions stored as electronic signals in electronic memory, where a set of such stored instructions may constitute steps in an inventive process, or may be used to complete an inventive function such as controlling, varying, generating, rotating, receiving, sending, computing, determining to name just a few inventive functions that may be completed by executing such stored electronic instructions or in the case of electron circuitry may be configured to complete pre-predetermined or pre-installed functions based on the receipt of certain signals. Further, it should be understood that each of the embodiments of the controllers, electronic circuitry and other associated devices described herein may be configured with the necessary hardware components to enable each to process signals much faster than humanly possible and to exchange signals much faster than humanly possible. Each of the embodiments of the present invention cannot practically be implemented in any amount of time that would be acceptable to one skilled in the art using human beings as substitutes for the systems and devices described herein. For example, the embodiments described herein involve methods that allow for the adjustment or variation of a compression ratio of an opposed piston engine based on signals received from sensors. Accordingly, the use of humans as substitutes for such methodologies is contrary to the objectives of the invention and does not result in the improvements provided by the invention because the inventive methodologies process signals many times faster than the human mind (within the time periods demanded by users of embodiments of the present invention and those skilled in the art of the present invention) to vary the compression ratio of an operating opposed piston engine.

One such processor or processors may be referred to herein as a programmable logic controller, or PLC.

As used herein, the term "and/or" includes any and all combinations of one or more of the associated listed items. As used herein, the singular forms "a," "an" and "the" are not intended to include the plural form, unless the context indicates otherwise.

As used herein, the term "embodiment" refers to an embodiment of the present invention.

Figure 1B:
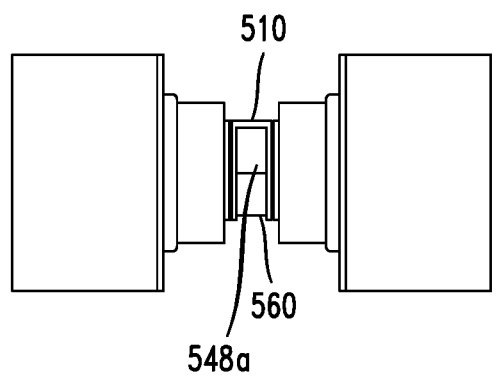

Referring now to FIGS. 1A and 1B there is depicted an opposed piston engine 500 according to an embodiment of the invention. As shown the engine 500 may comprise housings 505a,b enclosing a first cylinder 510 among other elements of the engine 500. A first pair of opposed pistons (not shown) are housed within the first cylinder 510.

Figure 2A:
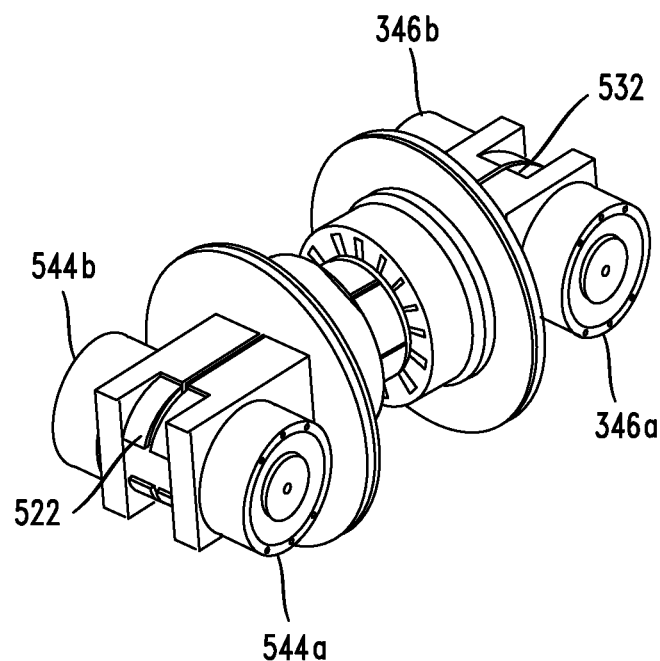
FIGS. 2A and 2B depict an opposed piston engine with a rotary valve mechanism with outer housings removed according to an embodiment of the invention.
Figure 2B:
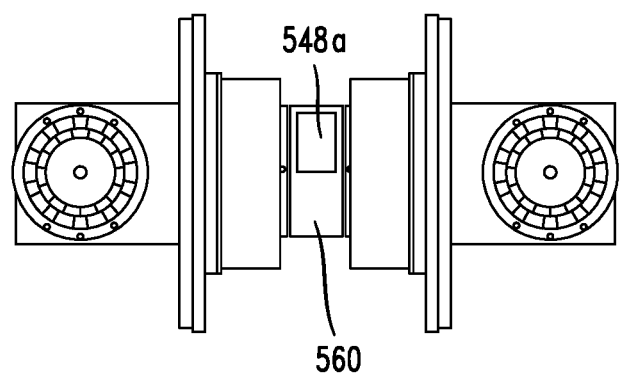
Figure 3C:
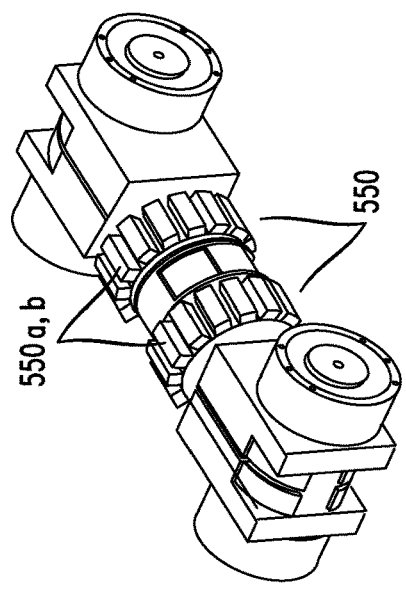
FIGS. 3A to 3F depict different views of an opposed piston engine and driving means for driving the rotary valve mechanism according to an embodiment of the invention.
Figure 3B:
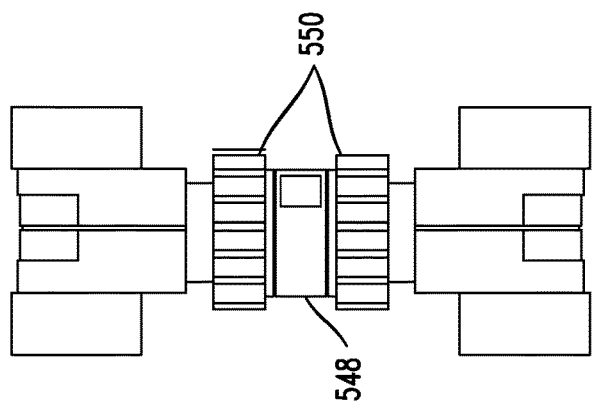
Figure 3A:
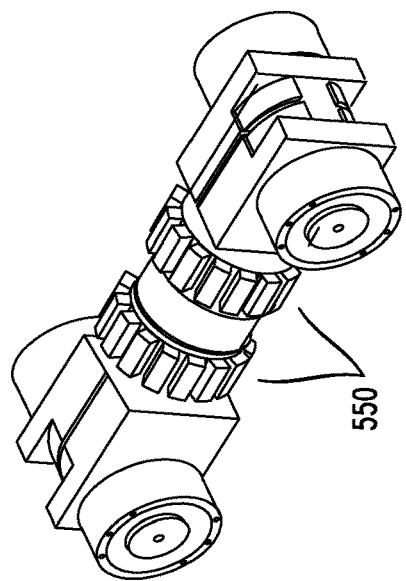
Figure 3F:
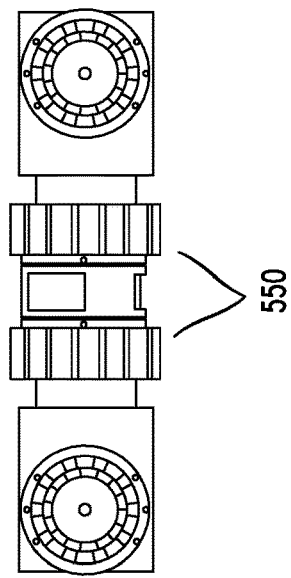
Figure 3E:
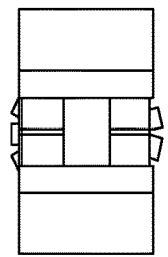
Figure 3D:
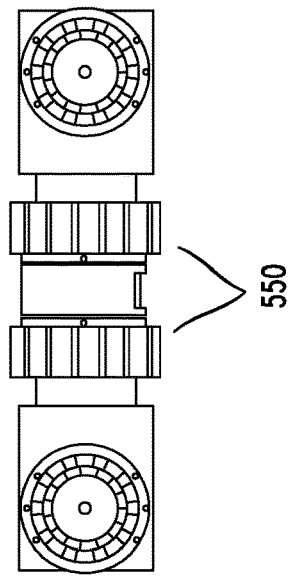

The opposed pistons may be connected via respective connection means 522, 532 (see FIG. 2A), where one example of connection means may be a rod connected to a crankshaft enclosed by a housing 505a or 505b. Each of the opposed pistons may reciprocatively move in a longitudinal direction within the cylinder 510 while the respective crankshafts rotate. Each associated crankshaft and/or connecting rod may be configured to aid in providing a predetermined stroke length to its associated piston residing within the cylinder 510. The opposed first and second pistons may have predetermined lengths and predetermined diameters. In accordance with an embodiment of the present invention, a combustion chamber may be formed between the two pistons within the cylinder 510.

In one embodiment, the stroke length of each of the opposed pistons may be about 3 inches. Thus, the total difference between the spacing of the pistons at closest approach to each other (i.e., at "top dead center" abbreviated "TDC") may range from 0 inches to 0.25 inches for example, and more preferably from about 0.05 inches to 0.2 inches, and the maximum spacing of the pistons during the engine cycle (i.e., at bottom dead center) may be about 4-7 inches.

Continuing, the engine 500 may further comprise a first driving means 544a,b. As shown means 544a,b may comprise, for example, an electric generator or electronic starter located on each side of first connection means 522. It should be noted that the driving means 544a.b may be attached to elements of the engine 500 in different configurations via belts or chains or gears without changing the principles of the present invention. Further, the first driving means 544a,b may operably communicate with the first connection means 522 (e.g., with a crankshaft and connected rod) to drive (move) the first piston in a longitudinal direction within the cylinder 510.

In more detail, the first driving means 544a,b may comprise a shaft (not shown) that is operable to rotate in response to electromagnetic forces created by magnets within means 544a,b. As a result, the crankshaft within connection means 522 may be moved as the shaft rotates.

In a similar fashion, in one embodiment, a second driving means 546a,b may comprise a shaft (not shown) that is operable to rotate in response to electromagnetic forces created by magnets within means 546a,b. As a result, the crankshaft within connection means 532 may be moved as the shaft rotates.

Once the engine 500 is started, the respective positions and speeds of the crankshafts that are a part of connection means 522,532 may be synchronized (i.e., controlled to move at a certain speed, e.g., the same speed), for example, by varying or controlling the power being output by the driving means 544a,b and/or 546a,b and applied to the connection means 522,532 described further herein.

Figure 4:
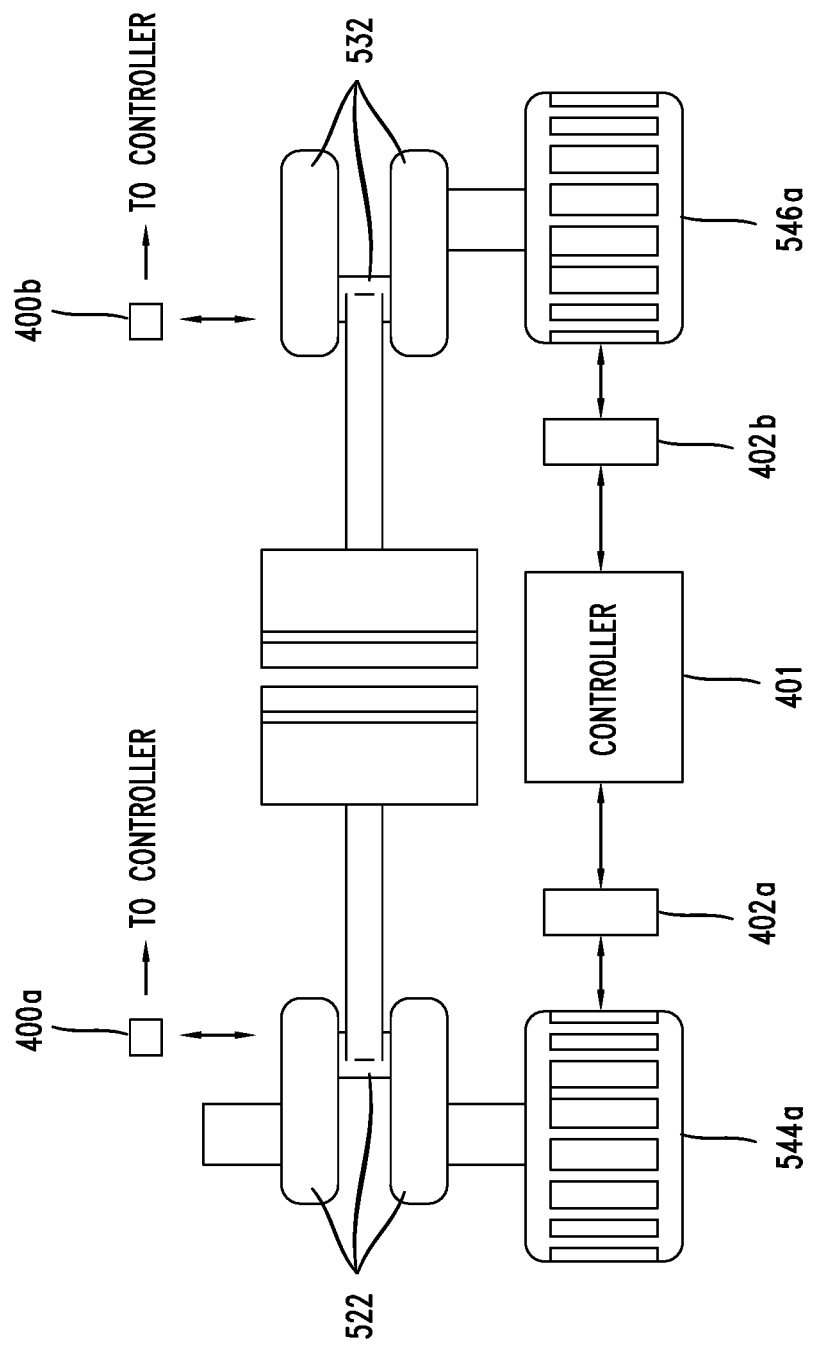
FIG. 4 depicts a simplified block diagram of a controller that may be used to control elements of an opposed piston engine according to an embodiment of the invention.

In another embodiment of the invention, a first position sensor 400a (see FIG. 4) may be positioned with respect to the crankshaft within the first connection means 522 to detect the position (e.g., rotational position) of the crankshaft and operably communicate signals representative of such a detected position(s) to a controller 401 (e.g., programmable logic controller, "PLC"). Similarly, a second position sensor 400b (see FIG. 4) may be positioned with respect to the crankshaft within the second connection means 532 to detect the position (e.g., rotational position) of the crankshaft and operably communicates signals representative of such a detected position(s) to a controller 401. It should be noted that the location of the sensors 400a,b depicted in FIG. 4 is merely exemplary and that the sensors 400a,b may be positioned at different locations to accurately determine the position of a respective crankshaft. Similarly, though only one sensor is shown for each connection means 522,532, more may be used to perform substantially the same function.

In an embodiment, upon receiving the signals from the position sensors 400a,b the controller 401 may be operable to determine the positions of elements of the driving means 522,532 (e.g., crankshafts). For example, the controller 401 may be operable to use the received signals to control the movement of, and therefore the positions of, the crankshafts within each connection means 522,532 and therefore, also the movements of, and positions of, the connecting rods within each connection means 522, 532. Further, by controlling the movement and positions of the connection means 522, 532 the controller 401 may be operable to control the movement and positions of the opposed pistons within the housing 505.

In an embodiment of the invention, the controller 401 may be operable to determine a present position of each of the opposed pistons within cylinder 510 based on the received signals from sensors 400a,b and referential data stored in memory. The controller 401 may execute instructions stored in memory to compute a real-time compression ratio for the engine 500 based on the signals it receives from sensors 400a,b that represent the present positions of elements of connection means 522,532 along with stored referential data such as a cross reference of the positions of the connection means 522,532 versus the volume of the combustion chamber, a cross-reference of the positions of the connection means 522,532 versus a resulting compression ratio, and a cross-reference of the requirements of the value of a compression ratio required based on a load and a fuel type, to name just a few examples. Thereafter, the controller 401 may be operable to generate and send electrical signals to load varying means 402a,b, such as a resistive array for example, that may be a part of driving means 544a,b and 546a,b to add or subtract a resistive load on respective generators that are a part of such driving means in order to adjust the voltage or current of such respective generators up or down. By adjusting the applied voltage or current applied to the driving means 544a,b and 546a,b using a load varying means 402a,b the energy being supplied by the driving means 544a,b and 546b a, b (generators) to the respective connection means 522,532 (crankshafts) may be controlled (up or down). That is to say, the controller 401 may use the signals it receives from sensor 400a,b, to determine the positions of the crankshafts within connection means 522, 532, and then depending on the determined positions, the controller 401 may send signals to one or more of the load varying means 402a,b to adjust the voltage or current being applied to one or more of the driving means 544a,b or 546a,b in order to decrease or increase the speed of the crankshafts within connection means 522,532. Such an adjustment may operably control the speed (e.g., rotational speed) of the rods and crankshafts within each connection means 522, 532, thereby, ultimately controlling the positions of the pistons within the cylinder 510. Accordingly, by controlling the positions of the pistons within the cylinder 510 the compression ratio may also be controlled or adjusted.

In an embodiment, either one or both opposed pistons may reach TDC at selected times in the combustion cycle by controlling the speed of the respective crankshafts within connection means 522,532 by controlling the power applied to driving means 544a,b and 546a,b. As the pistons move towards (or away) from one another the corresponding volume of the combustion chamber formed between the top surfaces of each opposed piston, for example, may therefore be adjusted, in effect varying the compression ratio of the engine 500.

In an embodiment, because the positions of the pistons may be controlled their movement can therefore be controlled to ensure that each moves to respective positions that correspond to a desired compression ratio during operation of the engine 500.

For example, if a lower compression ratio is desired the controller 401 may be operable to send signals to one or more of the load driving means 402a,b to decrease a resistive load applied to a generator that is a part of driving means 544a,b and 546a,b in order to provide an increase in energy to the connection means 522,532 (crankshafts) that allows one of the crankshafts, for example, to accelerate thereby allowing its associated piston to arrive at top dead center before the other piston does. Because the two pistons reach TDC at different times, the volume in the combustion chamber between the two opposed piston's top surfaces is greater than the volume that would occur if both pistons reached TDC at the same time. Because of the increased volume, the compression ratio is decreased. Similarly, to increase the compression ratio the crankshafts may be controlled (i.e., synchronized) so that the pistons reach TDC substantially simultaneously, representing the highest compression ratio possible for a given engine design and cycle.

In a further embodiment, to control the impedances of the engine 500, an impedance matching circuit (not shown) may be connected between the driving means 544a,b and 546a,b and controller 401, for example, to insure efficient use of the energy being applied to the driving means, for example. The impedance matching circuit may comprise an array of one or more of the following: inductors, resistors, capacitors, transformers and transmission lines, for example.

In another embodiment of the invention, one of crankshafts within one of connection means 522,532 may be controlled by a combination of the sensors, driving means, load varying means and a controller as explained above such that it is fixed in a position (i.e., "locked") thereby fixing the top surface of its respective, connected opposed piston at TDC, for example, within the cylinder 510. Further, the other crankshaft within one of connection means 522,532 may be free to move to various positions (i.e., "unlocked") therefore allowing its opposed piston to operate between TDC and bottom dead center. In an embodiment, a so configured engine 500 may be operated at 50% displacement, thereby enhancing the fuel efficiency of the engine 500.

Figure 5:
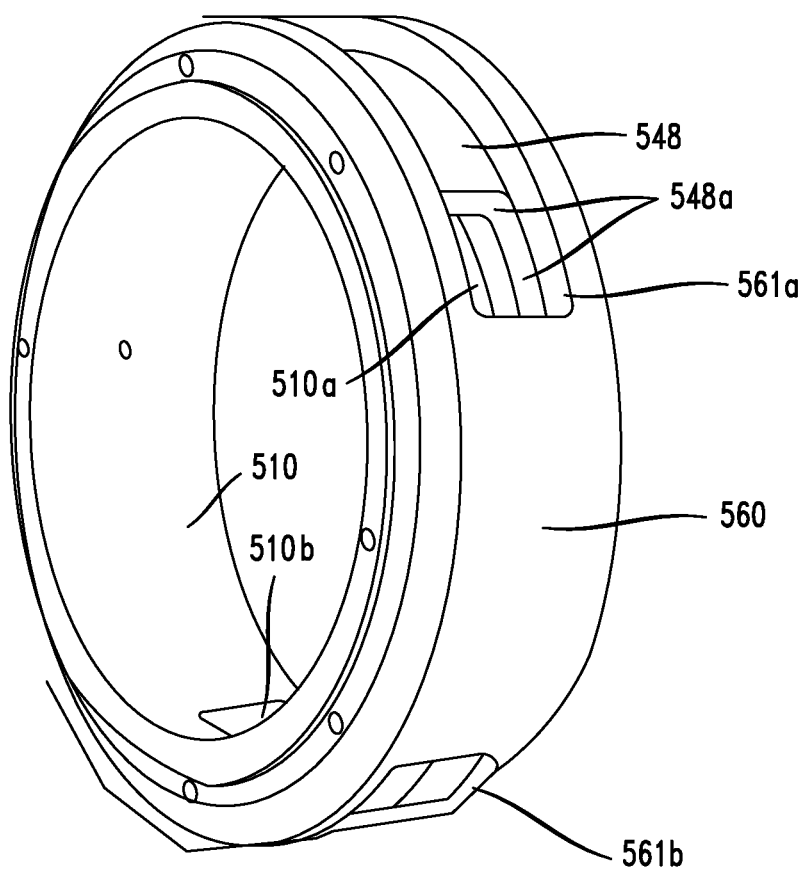
FIG. 5 depicts a view of one of the inner openings of cylinder as the outer opening of the rotary valve passes by it according to an embodiment of the invention.

Referring now to FIG. 5, in an embodiment an inventive engine may further comprise a rotatable collar 548 that may be slidably positioned coaxially and centrally around the cylinder 510. As shown, the collar 548 may be positioned between a portion of the fixed cylinder 510 and a portion of a fixed sealing bearing 560, The collar 548 may comprise an opening 548a for (i) receiving intake fuel as the opening 548a aligns with an intake opening 510a in the cylinder 510 and an intake opening 561a in the bearing 560 and (ii) expelling exhaust from the cylinder 510 as the opening 548a aligns with an exhaust opening 510b in the cylinder and exhaust opening 561b in the bearing as the engine 500 cycles through its respective combustion cycle (e.g., four-stroke combustion cycle).

In more detail, as the collar 548 and its opening 548a rotates it will separately align with either the inner intake opening 510a, imperforate portion of the cylinder 510 or inner exhaust opening 510b. FIG. 5 depicts the opening 548a aligning with the fixed, inner intake opening 510a of the cylinder and the fixed, outer intake opening 561 of the bearing 561 to allow fuel into the cylinder's combustion chamber. Correspondingly, as the opening 548a aligns with the fixed, inner exhaust opening 510b of the cylinder and the fixed, outer exhaust opening 561b of the bearing combusted gases may be expelled from the cylinder 510. This process of aligning with each of the intake and exhaust openings continues for so long as the engine is operation. It should be understood that a fuel injection system (not shown) may be provided as known in the art to inject the fuel through the openings 510a, 548a and 561a as the openings align.

In embodiments of the invention, the collar 548 may comprise a ceramic, such as silicon carbide or a ceramic of equal (or better) strength and performance. Further, the cylinder may also comprise ceramic, such as silicon carbide. Such ceramic materials do not require lubrication and are very resistant to wear over the long service life of the engine. In addition, silicon carbide is not adversely affected by any type of fuels and will in fact do well with the minor amounts of lubrication provided by the introduction of the fuel itself.

In an embodiment, the inventive intake opening 510a and exhaust opening 510b may be fixedly formed on the cylinder 510 and may be positioned along the circumference of the cylinder 510 such that the distance between them corresponds to an angular difference of 60 degrees, for example. As a result, 180 degrees of the cylinder 510 is imperforate (has no openings), while the remaining 180 degrees may include the first opening 510a in the circumference of the cylinder having a dimensions that correspond to an angular, arc measurement of 60 degrees followed by a circumferential imperforate portion that may have dimensions that correspond to an angular, arc measurement of 60 degrees, and finally the second opening 510b in the circumference of the cylinder having a dimensions that correspond to an angular, arc measurement of 60 degrees. Said another way, the intake opening and exhaust openings 510a,b in the cylinder are positioned along the circumference of the cylinder such that the distance between them corresponds to an angular difference of 60 degrees and, in addition, wherein the total circumference of the cylinder taken up by the two cylinder openings plus the difference between them equals 180 degrees.

The openings 510a,b are limited in how much of the outside circumference of the collar they can occupy one by the nature of a four-stroke, opposed piston engine. Each of the cylinder openings is limited to sixty-degrees of the outer and inner circumference of the cylinder, separated by sixty degrees between the two openings. In an embodiment, width of the opening 548a may be limited to the position of the piston at TDC. Said another way, the top piston ring should not cross the side of the opening 548a or extensive wear can occur if the top ring of the engine crosses the outline of the opening 548a because that is one of the central drivers of wear in engines.

Figure 1C:
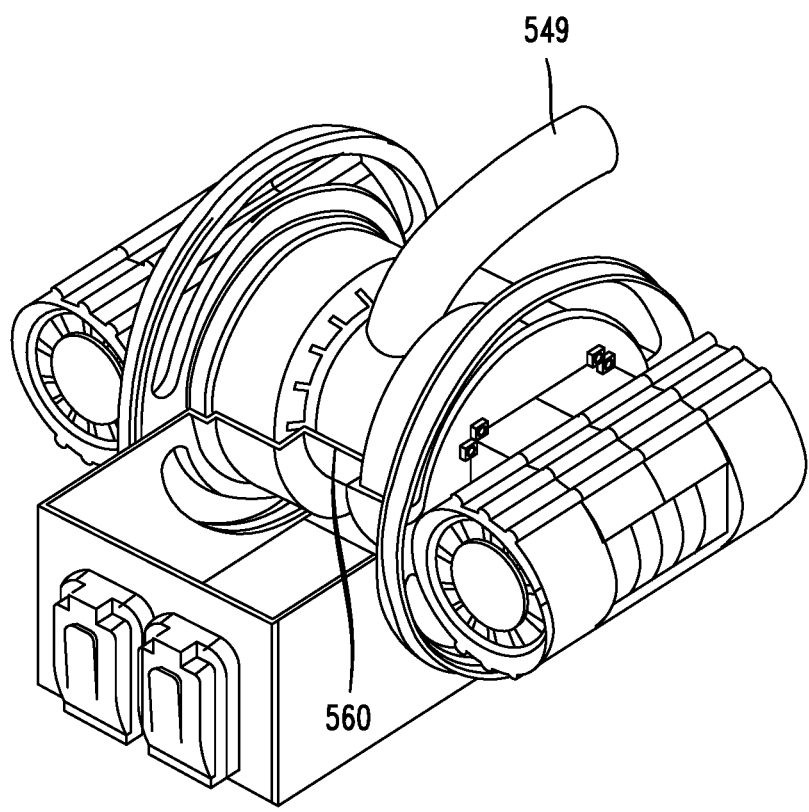
FIG. 1C depicts piping connected to a rotary valve mechanism according to an embodiment of the invention.

FIG. 1C depicts a view of an exhaust pipe 549 connected to the bearing 560 that functions to transport exhaust gases away from the chamber during a stroke of the engine's cycle as the valve opening 548a aligns with both the inner cylinder exhaust opening 510b and outer bearing exhaust opening 561b. Similarly, a fuel line (not shown) may be connected to the bearing 560 that functions to transport fuel to the chamber during a stroke of the engine's cycle as the valve opening 548a aligns with both the inner cylinder intake opening 510a and outer bearing intake opening 561a.

Referring now to FIG. 3, in accordance with the present invention a third driving means 550 (e.g., motor) may provide electromagnetic energy to the collar 548 in order to rotate the collar and its respective opening 548a. In embodiments of the invention the voltage and current supplied to the driving means 550 may be controlled by the controller 401 using a resistive array (not shown) to thereby provide a timed rotation of the collar 548 and opening 548a about the cylinder 510. Stated another way, the rotary speed of the collar 548 and its associated opening 548a may be controlled by the controller 401 to control the rotation of the collar 548, crankshafts 540 and 542 so that the opening 548a aligns with the openings 510a,b and 561a,b at the appropriate times to allow fuel to be appropriately fed to the engine's combustion chamber and/or allow combusted gases to be appropriately expelled.

In an embodiment, the third driving means may comprise a set of magnets 550a,b that are operable to generate electromagnetic forces to drive the rotary collar 548. Alternatively, the driving means may comprise a combination of belts and gears to drive the rotary collar 548.

Further, the controller 401 may control the rotational speed of the collar 548 such that the collar 548 and opening 548a may rotate at half the speed of an average crankshaft speed, whose speed may be determined by the controller 401 in conjunction with the sensors 400a,b described previously above. Further, the controller 401 may be operable to control the alignment of the first opening 548a of the collar 548 with the intake and exhaust openings 510a,b, 561a,b to coincide with certain positions and speeds of the crankshafts within connection means 522,532 by controlling the voltage or current generated by driving means 544a,b or 546a,b as described previously in order to align the pistons within the cylinder 510 as fuel enters the cylinder's combustion chamber between the piston heads, is combusted, and then exits the cylinder. Said another, way the controller 401 may be operable to control the speed and positions of the crankshafts to insure that the openings 510a,b, 561a,b are aligned (or not) with the collar opening 548a to complete an appropriate four-stroke cycle.

On example of driving means may be a generator provided by Sullivan Electronics in Maryland, USA.

The inventors believe that the inventive rotary valve mechanism eliminates the need to sue springs and poppet valves which rob engines of precious power and eliminates the reciprocal action inherent in standard valves by allowing an inventive engine to draw air on the intake stroke with no impedance to the flow of gasses in and out of the cylinder.

While exemplary embodiments have been shown and described herein, it should be understood that variations of the disclosed embodiments may be made without departing from the spirit and scope of the claims that follow.

We claim:

1. An opposed piston engine comprising:
   a rotatable collar slidably positioned coaxially and centrally around a fixed cylinder, wherein the collar is configured at a position between a portion of the fixed cylinder and a portion of a fixed sealing bearing, the collar comprising an opening for receiving intake fuel as the opening rotatably aligns with an intake opening in the cylinder and an intake opening in the bearing and for expelling exhaust from the cylinder as the opening separately, rotatably aligns with an exhaust opening in the cylinder and exhaust opening in the bearing as the engine cycles through its respective combustion cycle;
   driving means for rotating the collar and the opening in the collar; and
   a controller for controlling the voltage and current supplied to the driving means to control the rotation of the collar and the collar opening such that the collar opening aligns with the cylinder and bearing openings at the appropriate times to allow fuel to be appropriately fed to the engine's combustion chamber or allow combusted gases to be appropriately expelled from the combustion chamber, wherein the controller is further operable to control one or more rotational speeds of the collar and its respective opening, wherein one of the rotational speeds of the collar and the collar opening is half the speed of an average crankshaft speed.

2. The engine as in claim 1 wherein the rotatable collar comprises a ceramic.

3. The engine as in claim 2 wherein the ceramic comprises silicon carbide.

4. The engine as in claim 1 wherein the cylinder comprises a silicon carbide ceramic.

5. The engine as in claim 1 wherein the intake opening and exhaust opening in the cylinder are positioned along the circumference of the cylinder such that the distance between them corresponds to an angular difference of 60 degrees, and wherein the total angular degrees of the circumference taken up by the two cylinder openings and the difference is 180 degrees.

6. The engine as in claim 1 wherein a width of each cylinder opening is limited to the position of an opposed piston at top dead center.

7. The engine as in claim 1 wherein the engine comprises a four-stroke engine.

* * * * *